United States Patent [19]
Thorpe et al.

[11] 3,757,041
[45] Sept. 4, 1973

[54] TELEVISION SPECIAL EFFECTS CONTROL PULSE-GENERATING APPARATUS

[75] Inventors: Laurence Joseph Thorpe, Marlton; Joseph Allen Killough, Moorestown, both of N.J.

[73] Assignee: RCA Corporation, New York, N.Y.

[22] Filed: May 28, 1971

[21] Appl. No.: 147,877

[52] U.S. Cl. ............ 178/7.2, 178/DIG. 6, 307/261, 328/35, 328/160
[51] Int. Cl. ............ H04n 5/22
[58] Field of Search ............ 178/7.1, 7.2, DIG. 4, 178/DIG. 6, DIG. 30, 69.5 G; 307/228, 261; 328/14, 16, 35, 36, 160, 142, 178, 179, 181, 187, 188; 84/1.01

[56] References Cited

UNITED STATES PATENTS

| | | | |
|---|---|---|---|
| 3,671,667 | 6/1972 | Thorpe | 178/DIG. 6 |
| 2,240,420 | 4/1941 | Schnitzer | 178/DIG. 6 |
| 3,487,166 | 12/1969 | Ryan | 178/69.5 G |
| 3,590,131 | 6/1971 | Reyers | 84/1.03 |
| 3,500,213 | 3/1970 | Ameau | 328/14 |

*Primary Examiner*—Robert L. Griffin
*Assistant Examiner*—George G. Stellar
*Attorney*—Eugene M. Whitacre

[57] ABSTRACT

A digital frequency divider produces a plurality of divisional frequency pulses from clock pulses having a multiple of a camera scanning rate for conversion by a digital-to-analogue converter into a ramp type sawtooth-shaped timing wave at a frequency related to the camera scanning rate. An up-down type of digital frequency divider produces a triangle type sawtooth-shaped timing wave having the camera scanning rate frequency. The ramp type timing wave is multiplied by itself to produce a parabola type timing wave having a camera scanning rate frequency. Any of the timing waves is combined with variable direct current to generate pulses by which to control the transfer from the video signals of one camera to the video signals of another camera to produce composite video signals representative of selected parts of two scenes.

9 Claims, 16 Drawing Figures

INVENTORS
Laurence J. Thorpe and
Joseph A. Killough.
BY
ATTORNEY

INVENTOR.
Laurence J. Thorpe and
Joseph A. Killough.
BY
ATTORNEY

INVENTOR.
Laurence J. Thorpe and
Joseph A. Killough
BY [signature]
ATTORNEY

INVENTOR.
Laurence J. Thorpe and
Joseph A. Killough.
BY
ATTORNEY

INVENTOR.
Laurence J. Thorpe and
Joseph A. Killough
BY [signature]
ATTORNEY

TELEVISION SPECIAL EFFECTS CONTROL PULSE-GENERATING APPARATUS

BACKGROUND OF THE INVENTION

It is common practice in the operation of television systems to employ certain special effects techniques by which a composite picture is produced consisting of selected parts of two scenes as viewed by two cameras. Such effects are produced by selectively switching the video signals from the two cameras to develop composite video signals in an output circuit. The switching is accomplished under the control of pulses occuring at appropriate times during the horizontal and/or vertical scanning intervals of the cameras.

The composite picture may have any one of a variety of forms, such as split screens or iris type insets in the shapes of circles, squares, diamonds, etc. The control pulses are derived at one or both of the horizontal and vertical camera scanning rates and the timing of the pulses within the scanning intervals is under the control of an operator. In this way the proportioning of the two parts of a split screen may be varied and the size and positioning of the insets may be changed to produce the desired effects.

The control pulses are generated by developing a repetitive timing wave of a particular shape and combining it with direct current. Each time the repetitive wave increases over the magnitude of the direct current, a control pulse is produced to effect a switch from video signal A to video signal B. Each time the wave decreases below the magnitude of the direct current, another control pulse is produced to effect a switch from video signal B back to video signal A. Variation of the direct current magnitude by the operator changes the timing of the control pulses and, hence, the proportioning of the two scene parts in the composite picture produced from the combined video signals.

In the special effects apparatus presently in use the repetitive timing waves are developed by circuits including multivibrators and sawtooth wave generators of the type involving the charging and discharging of capacitors. Because certain components (including capacitors) of such apparatus have time constants, the operator control of the special effects often produces undesired results that subjectively are disturbing to a viewer of a composite picture. For example, when an iris type inset is changed in position, it may vary undesirably in size and may also "bounce" about in the main picture.

SUMMARY OF THE INVENTION

The control pulse-generating apparatus of this invention uses no capacitors or other time constant components in the development of the repetitive timing waves from which the pulses are derived. Instead it employs digital type components for the wave development and for the production of the requisite signal information by which to position the special effects patterns in the composite picture.

The timing wave-developing apparatus has a clock pulse generator operating at a frequency that is a multiple of one of the camera scanning rates. The clock pulses are divided down by a multiple output digital frequency divider, one output of which is compared with deflection synchronizing pulses at the selected scanning rate to produce a phasing signal that is applied to the clock generator to accurately phase lock it at the selected scanning rate.

A plurality of different divisional frequency outputs of the digital frequency divider are impressed upon a digital-to-analogue converter, the output of which is a ramp type sawtooth-shaped wave at a multiple of the selected scanning rate. This wave is combined with a variable direct current to develop positioning pulses by which to alter the placement of an inset type of special effect in a picture.

A ramp type of sawtooth-shaped wave, from which to generate switching pulses for the creation of a split screen type of effect, is developed by the digital-to-analogue conversion of the multiple divisional frequency outputs of another digital frequency divider coupled to the clock pulse generator.

A triangle type sawtooth-shaped timing wave is developed by impressing the clock pulses alternately upon the "up" and "down" terminals of an up-down counter type of digital frequency divider. Such a wave, when combined with a variable direct current, is used to generate switching pulses by which to create a diamond-shaped inset.

A parabola-shaped wave, used in the generation of switching pulses by which to produce a circular inset, is developed by electronically mutiplying a digitally produced ramp type of sawtooth-shaped wave by itself.

BRIEF DESCRIPTION OF THE DRAWINGS

For a more specific disclosure of the invention, reference may be had to the following description of a number of illustrative components thereof which is given in conjunction with the accompanying drawings, of which.

DESCRIPTION OF THE INVENTION

Figure 1:
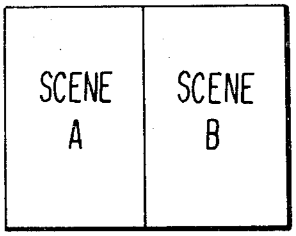
FIG. 1 is a diagram of a split screen type of special effect in which parts of two different scenes are displayed side-by-side.

A common form of special effect is that of a split screen display as shown in FIG. 1 where a part of scene A appears as the left-hand portion of the picture and a part of scene B appears as the right-hand picture portion. This type of special effect, as well as others, is created by using the video signals representative of scene A during the first part of each horizontal line scanning interval and by using scene B representative video signals during the second part of each horizontal line scanning interval.

Figure 2:
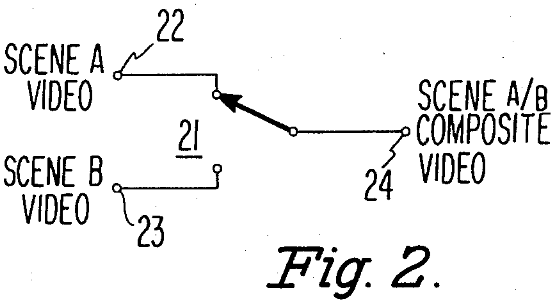
FIG. 2 illustrates the kind of switching operation necessary to display parts of two scenes as one composite picture.

Such video signal utilization is effected by means of a suitably controlled electronic switch represented by the switch 21 of FIG. 2. The video signals derived from a camera (not shown) that views scene A are impressed upon an input terminal 22 of the switch 21. Also, another camera (not shown) that views scene B produces video signals that are impressed upon an input terminal 23 of the switch. Operation of the switch 21 to its input terminal 22 at the start of each horizontal scanning interval of the cameras that respectively view scenes A and B, and to its input terminal 23 at some point during each horizontal scanning interval produces a composite video signal at the output terminal 24 of the switch. Such an output video signal produces the split screen effect as shown in FIG. 1. As will be seen, different timing of the operations of the switch 21 is used to produce other special effects.

The electronic switching apparatus represented by the switch 21 is controlled by switching pulses that are derived under the control of the same signals that control the scanning operations of the cameras. In order to avoid unnecessary complication of the disclosure of the invention, references herein will be confined to horizontal scanning operations and related special effects. It is to be understood, however, that the various disclosed embodiments of this invention are equally useful for the creation of effects related (1) only to vertical scanning operations and (2) to combined horizontal and vertical scanning operations. Hence, as used in this specification and in the claims, the term "camera scanning rate" and the like will be understood to apply to either or both of the horizontal and vertical scanning operations of the cameras.

Figure 3:
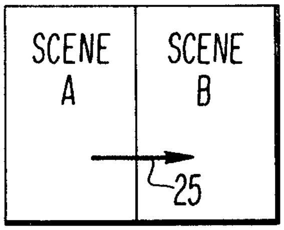
FIG. 3 indicates the manner in which the proportioning of the two parts of a split screen effect may be altered.

FIG. 3 represents a split screen type of display in which a "wipe" is made in the direction of an arrow 25 to change from scene B to scene A. Such a wipe is made by altering the timing of the operation of the switch 21 of FIG. 2. A similar wipe may be made in the opposite direction to change from scene A to scene B.

Figure 4:
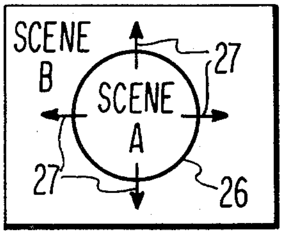
FIG. 4 shows a circular inset of one scene into another and the manner in which the inset may be changed in size.

FIG. 4 represents an iris type of inset of scene A into scene B. The inset 26 is circularly shaped and may be increased in size, thereby expanding scene A into scene B in the direction of arrows 27. Similarly, the inset 26 may be decreased in size by wiping in the opposite directions, thereby shrinking scene A out of scene B.

Figure 5:
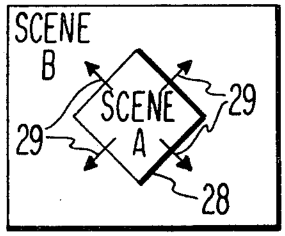
FIG. 5 depicts a diamond-shaped inset of one scene into another and the manner in which it may be changed in size.

In FIG. 5 an iris type inset 28 of diamond shape comprising a part of scene A is made into scene B. The size of the inset may be changed by a wiping operation as, for example, wiping in the direction of arrows 29 to increase its size, thereby effectively expanding scene A into scene B.

Figure 6:
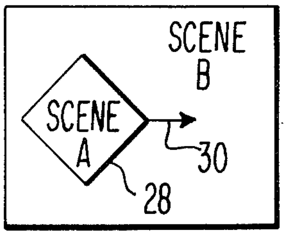
FIG. 6 indicates the manner in which an inset scene may be changed in position in another scene.

FIG. 6 illustrates that an inset, such as the diamond-shaped inset 28 of scene A, may be moved as indicated by an arrow 30 to any position within the confines of scene B or it may be swept in any direction completely out of scene B.

Figure 7:
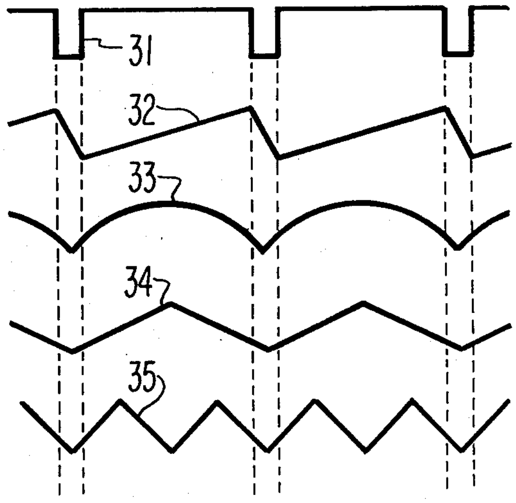
FIG. 7 illustrates some of the basic timing wave forms that are developed in the process of the generation of the switching and positioning pulses by which special effects, such as those shown in FIGS. 3, 4 and 5, are produced.

The special effects patterns, together with the wiping and positioning operations described, are typical of those achieved by prior art apparatus but they are better accomplished by the apparatus according to this invention. In the process of generating the switching and positioning pulses used to control an electronic switch such as that represented by the switch 21 of FIG. 2, a number of basic timing waves are developed. Some of these are shown in FIG. 7. They are all timed in relation to a series of reference pulses such as the scanning synchronizing pulses 31. A ramp type of sawtooth-shaped wave 32 having the frequency of the scanning synchronizing pulses 31 is used in the generation of the switching pulses by which the split screen type of effect of FIG. 3 is produced. It is also used in the novel manner of this invention in the development of a parabola-shaped wave 33. Such a wave is used in the generation of the switching pulses by which the circular iris type inset effect of FIG. 4 is produced. A triangle type of sawtooth-shaped wave 34 at the frequency of the synchronizing pulses 31 is used in the generation of the switching pulses by which the diamond-shaped iris type inset effect of FIG. 5 is produced. A multiple triangle wave 35 is used to generate the switching pulses by which a sawtooth-edged wipe of one scene into another is produced.

Figures 8, 9:
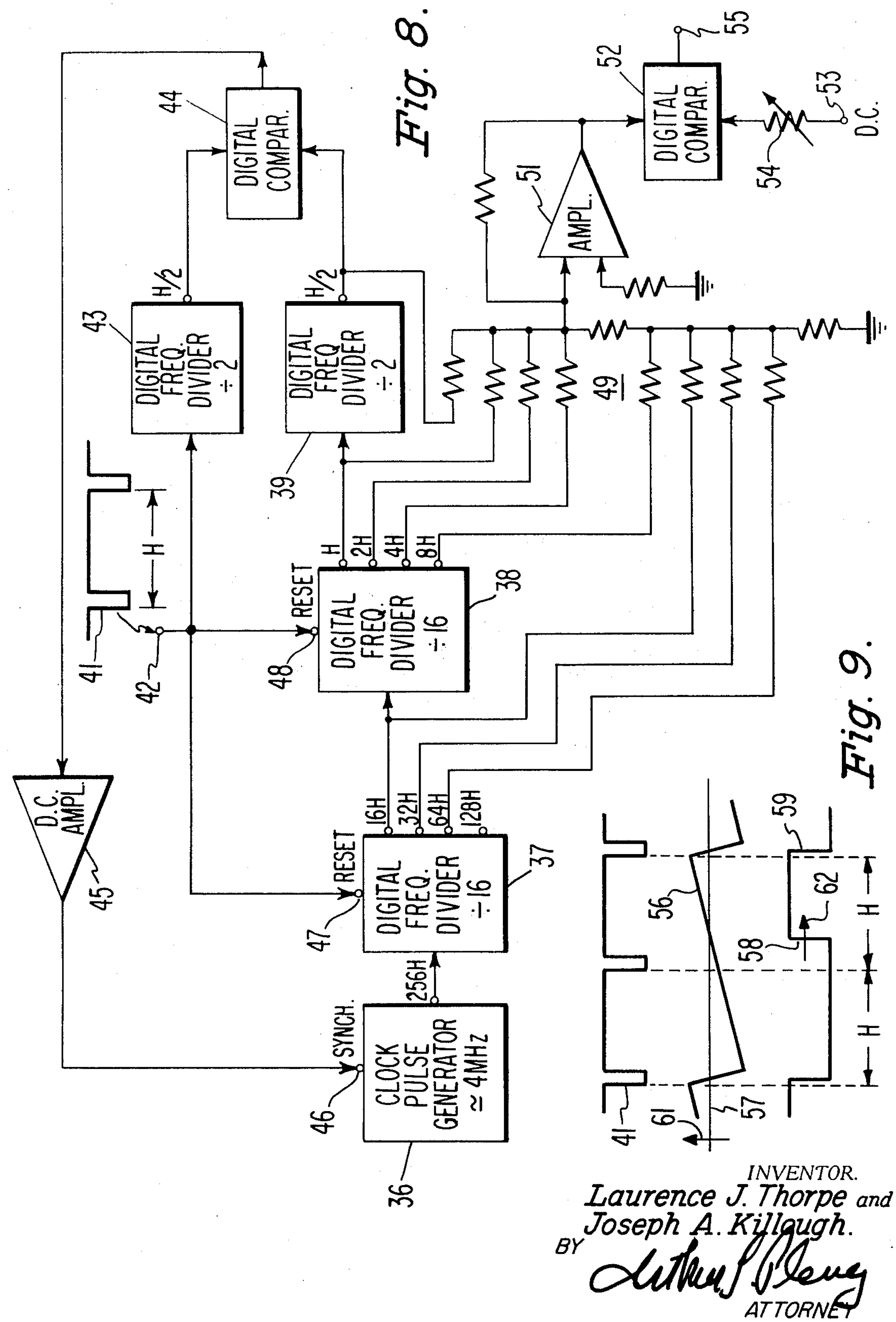
FIG. 8 is a functional diagram of apparatus in accordance with this invention by which positioning pulses are generated and by which the special effects generator is phase locked to reference signals such as the camera scanning synchronizing pulses.
FIG. 9 illustrates wave forms at key points of the apparatus of FIG. 8.

The apparatus of FIG. 8 functions to phase lock all of the special effects apparatus of the invention to a selected camera scanning rate. It also generates the positioning pulses by which a special effects pattern is moved as indicated in FIG. 6. The pulse generation and phase-locking process starts with a clock pulse generator 36 which operates at a frequency of approximately 4 MHz to produce a series of pulses at its output terminal 256H which have a frequency of 256 times that of the camera horizontal scanning rate. These pulses are impressed upon a digital frequency divider 37 having four output terminals 128H, 64H, 32H and 16H, the last of which is coupled to the input of another digital frequency divider 38. This divider also has four output terminals 8H, 4H, 2H and H, the last of which is coupled to the input of a third digital frequency divider 39 having a single output terminal H/2. All of the output terminals of the dividers 37, 38 and 39 are designated in terms of multiples or submultiples of the horizontal scanning frequency H.

Horizontal rate synchronizing pulses 41 that are present at a terminal 42 are impressed upon a fourth digital frequency divider 43, at the output terminal H/2 of which there is produced a square wave having the frequency of one-half the horizontal scanning rate. The square waves present respectively at the H/2 terminals of the dividers 39 and 43 are impressed upon a digital comparator 44, in the output of which is developed a direct current signal indicative of the phase relationship of the 256H output of the clock pulse generator 36 and the horizontal synchronizing pulses 41. This direct current signal is amplified by a DC amplifier 45 and is impressed upon a synchronizing and phasing terminal of the generator 36, thereby accurately phase locking the 256H pulse output of the generator to the horizontal scanning synchronizing pulses. The pulses 41 are also impressed as reset triggers upon the respective reset terminals 47 and 48 of the dividers 37 and 38 to insure their proper operation.

The eight digital bits derived from terminals 64H, 32H, 16H, 8H, 4H, 2H, H and H/2 of the frequency dividers 37, 38 and 39 comprising different divisional frequencies of the 256H frequency output of the clock pulse generator 36 — are impressed upon a digital-to-analogue converter 49. This converter consists of a precision ladder network of a plurality of resistors. The analogue output of the converter 49, in this case, is a sawtooth-shaped timing wave of the ramp type similar to the wave 32 of FIG. 7 but having a frequency H/2 which is one-half the horizontal scanning rate. After processing by an operational amplifier 51, the ramp type timing wave derived from the converter 49 is applied to one terminal of a digital comparator 52. Direct current present at a terminal 53 is impressed through a variable resistor 54 upon a second input terminal of the comparator 52. The combination of the ramp type timing wave and the direct current in the comparator 52 produces position-controlling pulses at the comparator output terminal 55. These pulses are used to control the switching pulse-generating apparatus in a manner presently to be described.

The generation of the position-controlling pulses is shown graphically in FIG. 9. The ramp type timing wave 56 that is derived from the amplifier 51 of FIG. 8 is shown in its time relationship to the horizontal synchronizing pulses 41 and to the direct current 57 derived from the terminal 53 of FIG. 8. Each time that the timing wave 56 increases in amplitude to a value greater than that of the direct current 57 a pulse 58 is generated and each time that the timing wave decreases to a value less than the magnitude of the direct current a pulse 59 is generated. A manipulation of the resistor 54 of FIG. 8 to increase the magnitude of the direct current 57 in the direction of an arrow 61 causes the effective movement in time of the pulse 58 in the direction of the arrow 62. Thus, by suitable manipulation of the variable resistor 54 of FIG. 8, the pulse 58 may be made to occur at any time within two successive horizontal scanning intervals. One use that may be made of such pulses is illustrated in FIG. 10.

Figure 10:
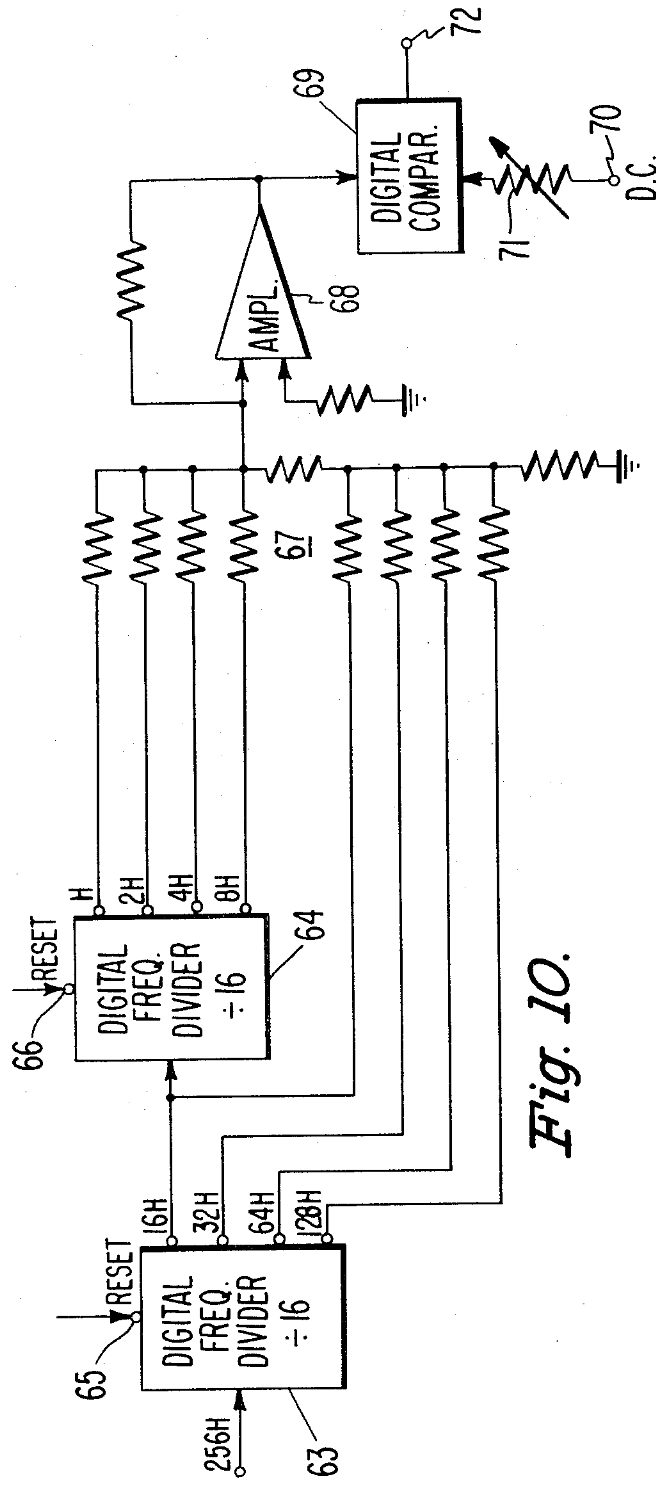
FIG. 10 is a partial diagram of apparatus coupled to the clock pulse generator of FIG. 8 for generating switching pulses at a selected camera scanning rate for producing a split screen type of picture such as that shown in FIG. 3.

The apparatus of FIG. 10 operates to generate switching pulses by which to produce the split screen effect of FIG. 3. It includes a digital frequency divider 63, the input of which is coupled to receive the 256H output of the clock pulse generator 36 of FIG. 8 and which has four divisional frequency outputs 128H, 64H, 32H and 16H. The 16H digital bit output of the divider 63 is impressed upon the input of another digital frequency divider 64 which also has four divisional frequency outputs 8H, 4H, 2H and H. The dividers 63 and 64 are phased in their operation by the impression on their respective reset terminals 65 and 66 of reference pulses such as the horizontal synchronizing pulses 41 of FIG. 8. The eight digital bit outputs of the dividers 63 and 64 are impressed upon a digital-to-analogue converter 67 which is similar to that of FIG. 8 and from which is derived a ramp type sawtooth-shaped timing wave having the frequency H of the horizontal scanning rate.

This ramp type wave, after processing by an amplifier 68, is impressed upon one input of a digital comparator 69. Direct current at a terminal 70 is impressed through a variable resistor 71 upon another input of the comparator 69 in which it is combined with the ramp type wave for the production, at the comparator output terminal 72, of switching pulses by which to achieve the split screen effect of FIG. 3.

Figure 11:
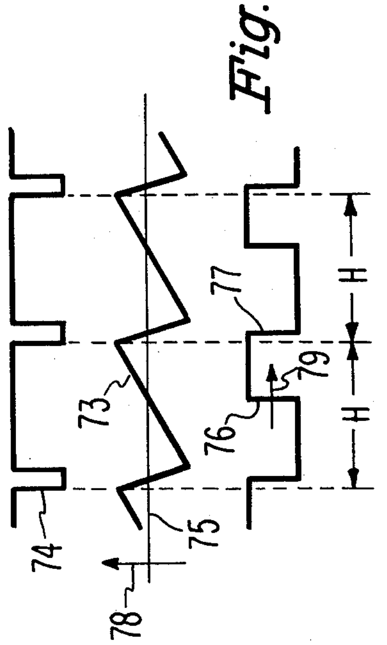
FIG. 11 illustrates wave forms at key points of the apparatus of FIG. 10.

In FIG. 11 the ramp type of sawtooth-shaped timing wave 73 that is derived from the amplifier 68 of FIG. 10 is shown in its relationship to reference pulses 74. For the purpose of generating switching pulses by which to produce the split screen effect of FIG. 3, these pulses may be the horizontal synchronizing pulses 41 that are used in such a case to phase the frequency dividers 63 and 64 of FIG. 10. When the amplitude of the ramp wave 73 increases above that of the direct current 75 derived from the terminal 70 of FIG. 10, a switching pulse 76 is generated at the output terminal 72 of the comparator 69 of FIG. 10. This switching pulse effects a change from scene A to scene B video signals as indicated in FIG. 3. A decrease in the amplitude of the ramp wave 73 below that of the direct current 75 generates a switching pulse 77 which effects a change from scene B to scene A video signals.

A manipulation of the variable resistor 71 of FIG. 10 to increase the magnitude of the direct current 75 in the direction of an arrow 78 causes the effective movement in time of the switching pulse 76 in the direction of an arrow 79. This indicates that the switch from scene A to scene B video signals occurs later in the horizontal scanning interval. Thus, by suitable manipulation of the resistor 71 of FIG. 10, the proportioning of the two scenes of FIG. 3 may be adjusted and a wipe from one scene to the other may be accomplished. The timing of the switching pulse 77 also is changed by the adjustment of the resistor 71 of FIG. 10 but, because this pulse always occurs during the blanking periods between successive horizontal line scansions, it does not affect the described wiping action.

Figures 12, 13:
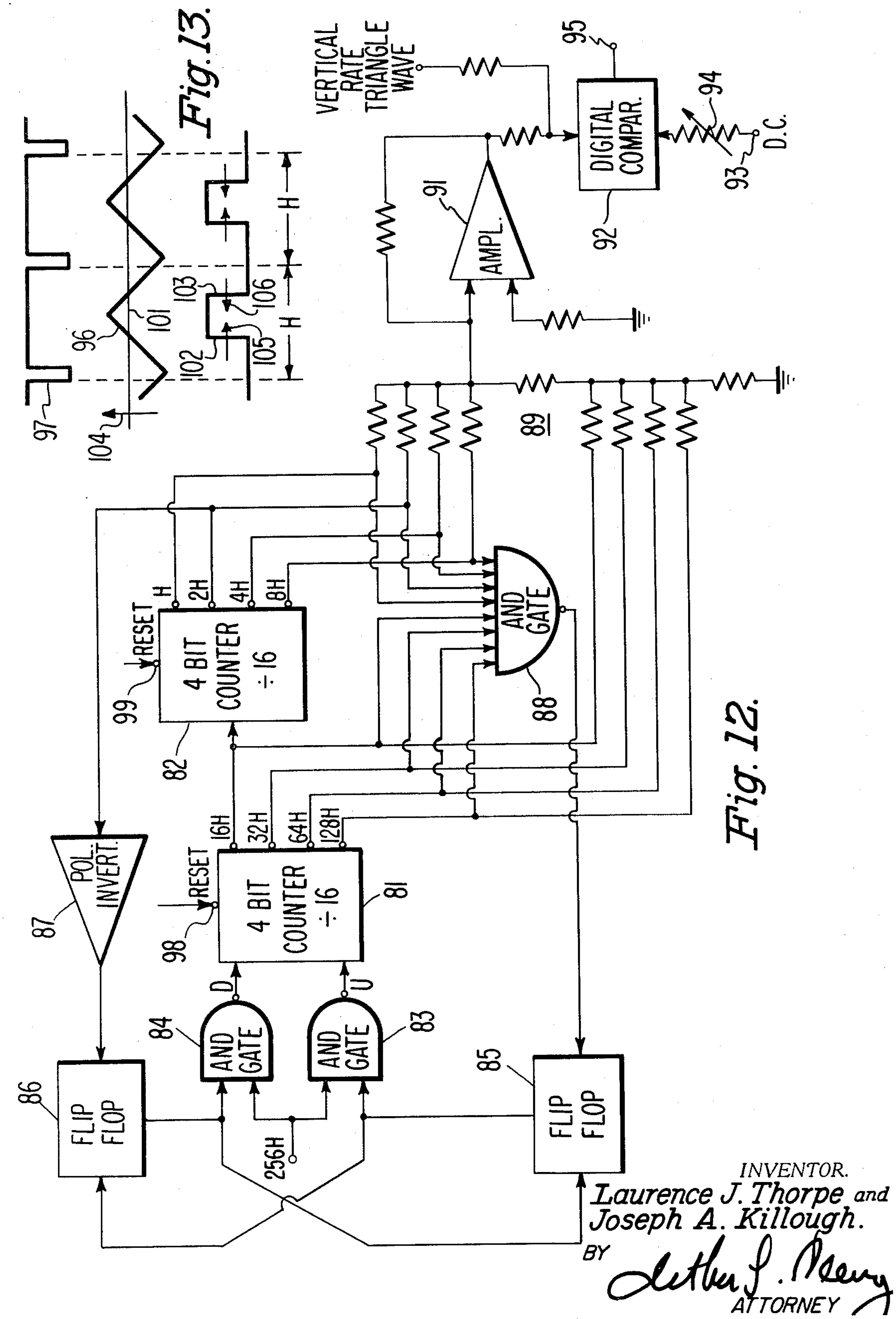
FIG. 12 is a functional diagram of other apparatus in accordance with this invention that is coupled to the clock pulse generator of FIG. 8 and by which switching pulses are generated to produce a diamond-shaped inset such as that shown in FIG. 5.
FIG. 13 illustrates wave forms at key points of the apparatus of FIG. 12.

The apparatus of FIG. 12 functions to generate switching pulses employed in the production of the diamond-shaped inset of FIG. 5. It includes an up-down digital counter 81, the up terminal U and the down terminal D of which are alternately coupled to the 256H output terminal of the clock pulse generator 36 of FIG. 8. The divider 81 has four divisional frequency outputs 128H, 64H, 32H and 16H, the last of which is coupled to the input of another 4 bit digital counter 82. This counter also has four divisional frequency outputs 8H, 4H, 2H and H. The impression of the 256H clock pulses alternately upon the U and D input terminals of the up-down counter 81 is effected by gates 83 and 84 coupled respectively between these terminals and the 256H terminal of the clock pulse generator 36 of FIG. 8. The gates 83 and 84 are operated alternately by respective flip-flops 85 and 86.

Under the control of the flip-flop 85, the gate 83 is opened at the beginning of each operating period to apply the 256H clock pulses to the U terminal of the counter 81 causing the counters 81 and 82 to count up. At the midpoint of each operating period the digital bit information that is derived from the 2H terminal of the counter 82 at twice the horizontal scanning rate is impressed through a polarity inverter 87 upon an input of the flip-flop 86. This produces a control signal in the output of the flip-flop which opens the gate 84 to apply the 256H clock pulses to the D terminal of the counter 81 which causes the counters 81 and 82 to count down. The control signal from the output of the flip-flop 86 also is impressed upon an input of the flip-flop 85 causing it to remove its control signal from the gate 83 so that it remains closed to the clock pulses for the remainder of the operating period.

All of the divisional frequency outputs of the counters 81 and 82 are impressed upon an AND gate 88 which, at the end of each operating period, produces a signal in its output that is applied to an input of the flip-flop 85. This flip-flop then produces a control signal in its output that is applied to the gate 83 to open it again to the 256H clock pulses. This control signal also is applied to an input of the flip-flop 86 causing it to close the gate 84 to the 256H clock pulses. The described operating cycle then repeats with the counters 81 and 82 first counting up and then down.

All of the divisional frequency outputs of the counters 81 and 82 also are impressed upon a digital-to-analogue converter 89 which is similar to the converters 49 and 67 of FIGS. 8 and 10 respectively. The triangle type of sawtooth-shaped timing wave that is produced by the converter 89, after processing by an amplifier 91, is impressed upon one input of a digital comparator 92 in which it is combined with direct current that is applied to another input of the comparator from a terminal 93 by a variable resistor 94 to produce switching pulses at the comparator output terminal 95.

In FIG. 13 the triangle timing wave 96 developed by the digital-to-analogue converter 89 of FIG. 12 is shown in its relation to reference pulses 97 that are applied to the reset terminals 98 and 99 of the counters 81 and 82 of FIG. 12. These reference pulses may be the horizontal synchronizing pulses, such as the pulses 41 of FIG. 8, or they may be the positioning pulses 58 of FIG. 9. Both ascending and descending slopes of the timing wave 96 are equal and the wave is centered in an operating period between reference pulses 97. When the amplitude of the wave 96 increases to a value greater than that of the direct current 101, a switching pulse 102 is generated and when it decreases to a lesser value than the direct current a switching pulse 103 is generated. An adjustment of the resistor 94 of FIG. 12 to increase the value of the direct current 101 in the direction of an arrow 104 causes the switching pulses 102 and 103 to effectively approach one another in time as indicated by arrows 105 and 106.

By logically combining the switching pulses 102 and 103, that are generated with reference to the horizontal scanning rate, with similar switching pulses, that are generated in a manner like that described but with reference to the vertical scanning rate, the diamond-shaped inset 28 of FIG. 5 may be produced. Such a logical combination is effected by the indicated application to the comparator 92 of FIG. 12 of a vertical rate triangle wave in addition to the described horizontal rate wave 96 of FIG. 13. The size of the inset is changed by the manipulation of variable resistors such as the resistor 94 of FIG. 12. Also, as indicated in FIG. 6, the position of the inset 28 may be changed in a horizontal direction 30. This is accomplished by manipulation of the variable resistor 54 of FIG. 8 which, as described, changes the timing of the positioning pulse 58 of FIG. 9. When such positioning pulses are applied to the counter reset terminals 98 and 99 of FIG. 12, and therefore become the reference pulses 97 of FIG. 13, it is seen that the operating period of the triangle wave 96 of FIG. 13, and hence the timing of the switching pulses 102 and 103, may be made to occur at any point in the time span of two horizontal scanning intervals. In this way, not only is it possible to move the scene A inset 28 of FIG. 6 horizontally to any part of the scene B area but also the scene A inset may be swept completely out of scene B with or without changing its size. Positioning apparatus similar to that described is employed to change the position of the FIG. 6 inset 28 vertically within, and/or to sweep it entirely out of, the picture. Also, by logically combining switching and positioning pulses at both horizontal and vertical scanning rates the inset may be changed in position diagonally.

Figure 14:
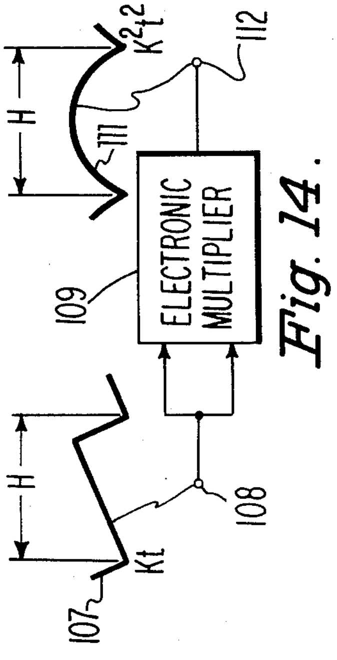
FIG. 14 shows a simple electronic circuit by which a ramp type of sawtooth-shaped wave is converted into a parabola-shaped wave in accordance with this invention.

The switching pulses that are used in the formation of the circular inset 26 of FIG. 4 are generated from a parabola-shaped timing wave. Such a wave is derived from a ramp type of sawtooth-shaped wave but not by integration of the ramp wave as in prior art apparatus because such a process involves circuits having time constants which produce objectionable effects. It can be demonstrated mathematically that a parabolic wave can also be produced by squaring a ramp type wave. Hence, in accordance with this invention as indicated in FIG. 14, a ramp wave represented by the expression Kt present at a terminal 108 is impressed upon both inputs of an electronic multiplier 109 in which the wave is multiplied by itself (i.e., squared) to produce a parabolic wave 111 represented by the expression $K^2t^2$ at the output terminal 112.

Figure 15:
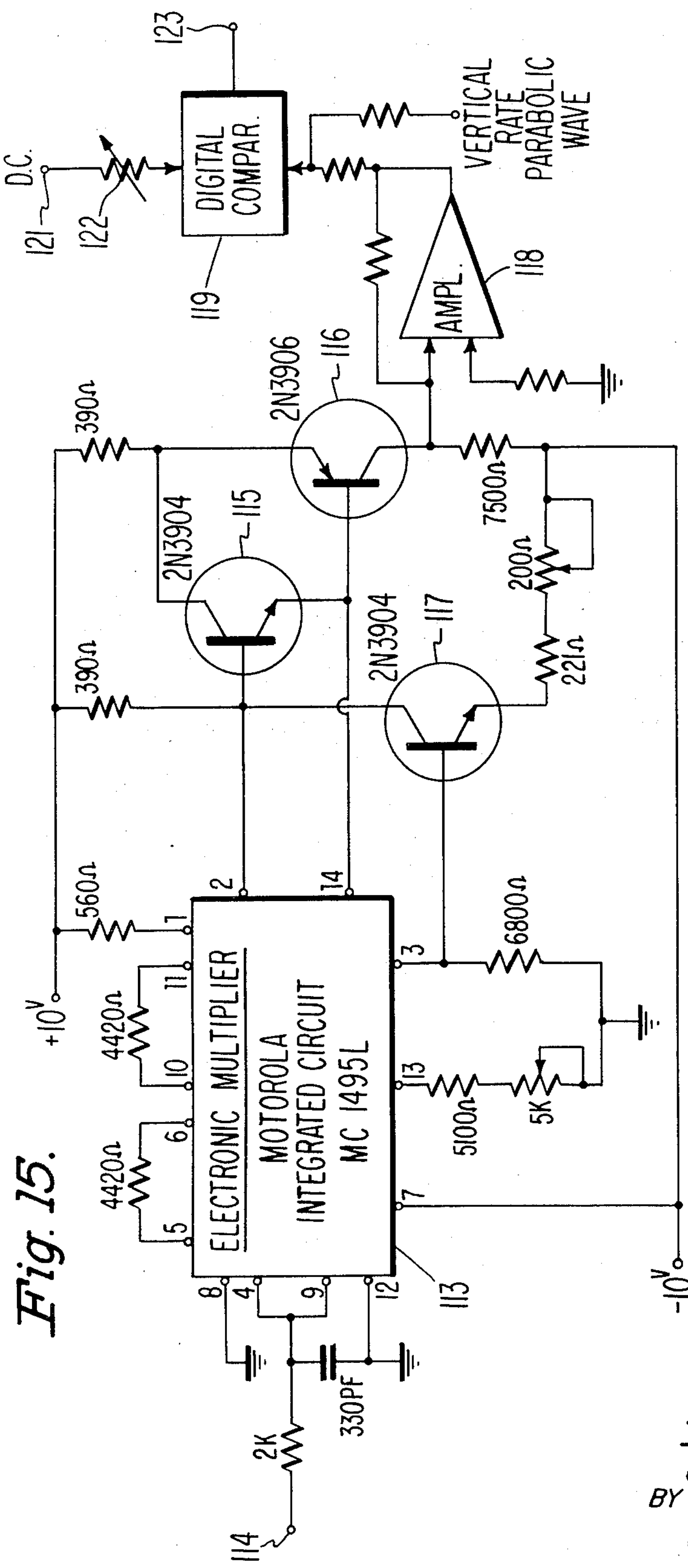
FIG. 15 is a fragmentary circuit and functional diagram of apparatus coupled to the timing wave developing apparatus of FIG. 8 and used in an embodiment of the invention to produce a parabola-shaped wave by the principle illustrated in FIG. 14 and from which are derived switching pulses effective to create a circular inset such as that shown in FIG. 4.

The particular apparatus used in the embodiment of the invention to develop a parabolic timing wave and the switching pulses used in the production of the circular inset 26 of FIG. 4 is shown in FIG. 15. The electronic multiplier 113 is a Motorola integrated circuit monolithic chip MC 1495L. The ramp timing wave 73 of FIG. 11 that is derived from the amplifier 68 of FIG. 10 is impressed upon the terminal 114 of the FIG. 15 apparatus from which it is applied to both inputs of the integrated circuit 113. In the output of the integrated circuit, which includes three transistors 115, 116 and 117, there is produced a parabolic timing wave that is processed by an amplifier 118 and applied to one input of a digital comparator 119. Direct current at a terminal 121 is applied through a variable resistor 122 to another input of the comparator 119. As in the previously described pulse-generating apparatus embodying the invention the parabolic wave is combined with the direct current to produce switching pulses at an output terminal 123.

Figure 16:
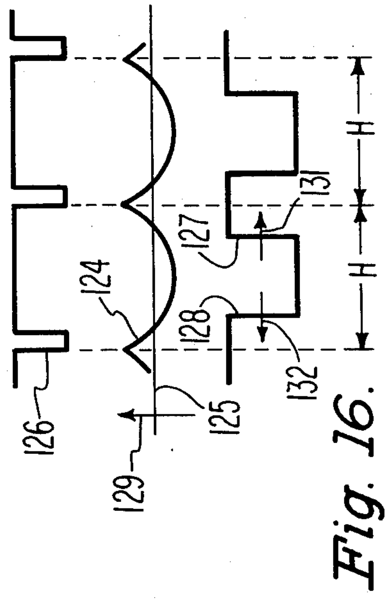
FIG. 16 illustrates wave forms at key points of the apparatus of FIG. 15.

Such switching pulse generation is shown graphically in FIG. 16. The parabolic timing wave 124 that is developed at the output of the amplifier 118 of FIG. 15 is shown in its relationship to the direct current 125 applied to the comparator 119 of FIG. 15 and to reference pulses 126. These pulses are those that are applied to the frequency divider reset terminals 65 and 66 of the FIG. 10 apparatus by which the ramp type wave applied to the terminal 114 of the FIG. 15 apparatus is developed. These reference pulses may be the horizontal synchronizing pulses, such as the pulses 41 of FIG. 8, or they may be the positioning pulses 58 of FIG. 9. An increase in the amplitude of the parabolic timing wave 124 over that of the direct current 125 generates a switching pulse 127 and a decrease in the parabolic wave amplitude below that of the direct current generates a switching pulse 128. An adjustment of the resistor 122 of FIG. 15 in the direction of an arrow 129 causes the pulses 127 and 128 to move effectively in time in the directions of arrows 131 and 132 respectively. In this way the size of the circular inset 26 of FIG. 4 may be changed.

In a manner similar to that described in connection with the production of the diamond-shaped inset 28 of FIG. 5 the switching pulses 127 and 128 of FIG. 16 are combined logically with similar switching pulses generated with reference to the vertical scanning rate to effect production of the circular inset 26 of FIG. 4. Such a logical combination is effected by the indicated application to the comparator 119 of FIG. 15 of a vertical rate parabolic wave in addition to the described horizontal rate wave 124 of FIG. 16. Also, in a manner similar to that described with reference to the FIG. 5 inset 28, the use of the positioning pulses 58 of FIG. 9 as the reference pulses 126 of FIG. 16 by their application to the frequency divider reset terminals 65 and 66 of FIG. 10 enables the positioning of the circular inset 26 of FIG. 4 at any place in the picture and even the sweeping of the inset entirely out of the picture in any direction.

The described generators of the switching and positioning pulses provide an improved digital type of special effects generating system that completely obviates the major disadvantages of the prior art analogue type systems. Because no time constant circuits are used in the present apparatus the various timing waves, from which the pulses are derived, respond instantly and linearly to direct current control.

A further advantageous feature of the present apparatus is the use of the phase locked loop of FIG. 8 as the basis for the development of all of the timing waves. The advantage of such a feature is that the apparatus needs no circuit changes or adjustments to operate in any of the international television systems such as:

| | | | |
|---|---|---|---|
| U.S. | NTSC | 525 lines | 60HZ |
| European | PAL | 635 lines | 50HZ |
| British | Monochrome | 405 lines | 50HZ |

Conventional analogue type special effects generators require many adjustments and/or circuit modifications to compensate for amplitude changes of the timing waves resulting from the different integration times necessitated by the variety of horizontal and vertical scanning rates of the different systems. In the digital type apparatus of the present invention, once the phase locked loop automatically locks in to whatever horizontal and vertical triggers are present in a given television system the digital counters function the same in any system. Also, no amplitude changes in the timing waves are experienced in different television systems because of the use of digital-to-analogue converters in the development of such waves.

What is claimed is:

1. In a special effects generator for a television system having at least two signal sources for developing two sets of video signals respectively representative of two scenes which are scanned at horizontal and vertical rates, apparatus for generating control pulses by which to transfer selected portions of said two sets of video signals to an output circuit in which to produce composite video signals representative of parts of said two scenes, said pulse-generating apparatus comprising:

a clock pulse generator producing output pulses having a frequency at a multiple of one of said scanning rates;

wave-producing means including a digital frequency divider coupled to said clock pulse generator to provide a plurality of different divisional frequency pulses therefrom and a digital-to-analogue converter responsive to said different frequency pulses to develop a timing wave having a frequency related to said one scanning rate by the factor N/2 where N is an integer equal to 1 or 2;

a first digital comparator coupled to receive said timing wave from said wave-producing means of a first one of its inputs; and a source of direct current coupled to said first comparator at a second one of its inputs for combination with said timing wave to produce said control pulses in the output of said first comparator in accordance with which magnitude of said timing wave and said direct current is the greater at any one instant of time.

2. Pulse-generating apparatus as defined in claim 1 wherein:

said direct current coupled to said first comparator is adjustable in magnitude, whereby to vary the effective timing of said control pulses.

3. Pulse-generating apparatus as defined in claim 2 wherein:

said wave-producing means also includes, a second digital comparator coupled to compare the phase of one of the outputs of said frequency divider with a signal corresponding to said one scanning rate to develop a direct current signal indicative of the phase relationship existing therebetween, and means impressing said direct current signal upon said clock pulse generator to maintain an accurate phase relationship of said timing wave relative to said one scanning rate.

4. Pulse-generating apparatus as defined in claim 3 wherein:

said wave-producing means is operative for developing a sawtooth-shaped timing wave and further includes, a digital-to-analogue converter comprising a plurality of resistors individually connected as a network to a plurality of the outputs of said digital frequency divider and commonly coupled to an output circuit in which to produce said timing wave having a sawtooth shape.

5. Pulse-generating apparatus as defined in claim 4 wherein:

the lowest frequency output of said digital frequency divider that is connected to said resistor network is one-half of that of said one scanning rate whereby, said sawtooth-shaped timing wave is a ramp having a frequency equal to one-half of said one scanning rate, a gradual slope in one direction during two successive scanning intervals of said video signal and a steep slope in a second direction during blanking periods between alternate scanning intervals of said video signal.

6. Pulse-generating apparatus as defined in claim 4 wherein:

the lowest frequency output of said digital frequency divider that is connected to said resistor network is the same as that of said one scanning rate whereby, said sawtooth-shaped timing wave has a frequency equal to said one scanning rate, a gradual slope in one direction during a scanning interval of said video signal and a steep slope in a second direction during blanking periods between successive scanning intervals of said video signal.

7. Pulse-generating apparatus as defined in claim 6 wherein:

said wave-producing means additionally includes, an electronic multiplier having two inputs and one output, and means impressing said sawtooth-shaped timing wave upon both inputs of said multiplier to produce a parabola-shaped timing wave of frequency equal to said one scanning rate in said multiplier output.

8. Pulse-generating apparatus as defined in claim 4, wherein:

said frequency divider is a digital up-down counter, and said wave-producing means further includes, two gates coupled between said clock pulse generator and said counter and separately operable to impress pulses from said clock pulse generator upon said counter as up and down pulses respectively, and gate-operating means responsive to outputs of said frequency divider to operate a first one of said gates at the beginning of each wave-producing means operating period and a second one of said gates at the midpoint of each of said operating periods whereby, said sawtooth-shaped timing wave is a triangle having a frequency equal to said one scanning rate, a given slope in one direction during the first half of each of said operating periods and an equal, given slope in a second direction during the second half of each of said operating periods.

9. Pulse-generating apparatus as defined in claim 8 wherein:

said gate-operating means includes, two flip-flop devices each having two inputs and one output, an AND gate coupled between the plurality of outputs of said digital frequency divider and one input of a first one of said flip-flop devices to cause it to produce in its output an operating signal for said first gate at the beginning of each of said wave-producing means operating periods, means coupling the double scanning interval frequency output of said digital frequency divider to one input of a second one of said flip-flop devices to cause it to produce in its output an operating signal for said second gate at the midpoint of each of said operating periods, and means cross-coupling the outputs of each of said flip-flop devices to the other inputs of said respective devices.

* * * * *

UNITED STATES PATENT OFFICE
CERTIFICATE OF CORRECTION

Patent No. 3,757,041 Dated Sept. 4, 1973

Inventor(s) Laurence Joseph Thorpe et al.

It is certified that error appears in the above-identified patent and that said Letters Patent are hereby corrected as shown below:

Column 2, line 1, that portion reading "clock generator" should read -- clock pulse generator --. Column 9, line 57, that portion reading "635 lines" should read -- 625 lines --. Column 10, line 28, that portion reading "means of a first" should read -- means at a first --.

Signed and sealed this 19th day of February 1974.

(SEAL)
Attest:

EDWARD M.FLETCHER,JR.
Attesting Officer

C. MARSHALL DANN
Commissioner of Patents

FORM PO-1050 (10-69)
3530 6|72

USCOMM-DC 60376-P69
★ U.S. GOVERNMENT PRINTING OFFICE : 1969 O—366-334